3,257,331
LECITHIN COMPOSITION
Richard A. Jameston, Minneapolis, and Russell A. Eversole, Excelsior, Minn., assignors to Cargill, Incorporated, Wilmington, Del., a corporation of Delaware
No Drawing. Filed Jan. 24, 1964, Ser. No. 339,890
10 Claims. (Cl. 252—363.5)

This invention relates generally to a lecithin composition, and more particularly relates to an improved water-dispersible lecithin composition, and to a method of treating lecithin to improve the water-dispersibility thereof.

Lecithin is a know surface active agent and is useful as a pigment wetting agent and suspending agent in coating compositions, as an ironing aid in laundry starch, and as an anti-static agent in textiles.

As used herein, the term "lecithin" is intended to mean the lecithin of commerce, which is a mixture of phospholipids, glyceride oils and fatty acids. Lecithin is conventionally sold on the basis of the amount of acetone insoluble (A.I. value) material present in the lecithin. The percent of glyceride oil present in a lecithin sample is determined by subtracting the A.I. value of the lecithin from 100. Generally, lecithin has an A.I. value in excess of 50, although in some instances the A.I. value of lecithin may be as low as 40.

Lecithin is not soluble in water and is not readily dispersible therein, and unless lecithin is modified or emulsified it cannot be readily utilized as a surface active agent in water base compositions. Various methods have been proposed for treating lecithin to render it water-dispersible or water-soluble, including reacting lecithin with a hydrophilic compound and/or mixing lecithin with an emulsifier to form a lecithin composition which has the correct hydrophilic-lipophilic balance necessary to render the lecithin composition water-dispersible. This invention concerns a discovery that a desirable lecithin composition that is readily water-dispersible may be prepared by forming a mixture of lecithin and a particular emulsifier.

It is a principal object of the present invention to provide an improved lecithin composition. A further object is to provide an improved water-dispersible lecithin composition. An additional object is to provide a method for the treatment of lecithin to increase the water-dispersibility thereof.

Other objects and advantages of the present invention will become apparent from the following detailed description.

Generally, the present invention is directed to a water-dispersible lecithin composition which comprises a mixture of lecithin and a polyethoxylated interesterified triglyceride oil emulsifier containing at least about 10 mols of ethylene oxide per mol of oil. Desirably, the vegetable oil emulsifier comprises about 2 percent to about 20 percent by weight of the lecithin composition and is interesterified with from about 3 percent to about 30 percent by weight of a polyhydric alcohol. The water-dispersible lecithin composition may also contain a polyhydric aliphatic alcohol which may be either straight chain or branch chain compounds.

The present invention also relates to a method of treating lecithin to increase the water-dispersibility thereof which comprises admixing oil emulsifier containing at least 10 mols of ethylene oxide per mol of vegetable oil with lecithin to form a lecithin composition. A polyhydric aliphatic alcohol, either straight chain or branch chain compounds, may also be admixed with the lecithin and polyethoxylated interesterified oil by the method of the invention.

Generally, the water dispersible lecithin composition may be prepared from any lecithin. The lecithin may be bleached or unbleached fluid lecithin, or bleached or unbleached plastic lecithin. However, where the end use of the water-dispersible lecithin composition is in a coating composition, it is generally preferable to employ double bleached plastic lecithin. A specific example of a lecithin which may be made water-dispersible in accordance with the present invention is a double bleached plastic soybean lecithin generally having an A.I. value in excess of 60.

The water-dispersible lecithin composition desirably contains at least about 75 percent lecithin, and it is generally preferable to employ from about 75 percent to about 90 percent lecithin by weight. A particularly suitable lecithin composition prepared in accordance with the present invention contains about 85 percent lecithin by weight.

The water-dispersible lecithin composition is prepared by forming a mixture of lecithin and a polyethoxylated interesterified oil emulsifier. The polyethoxylated interesterified triglyceride oil generally comprises from about 2 percent to about 20 percent by weight of the lecithin composition, and most preferably comprises from about 5 percent to about 15 percent by weight.

Any of the known triglyceride oils, whether of animal or vegetable origin, may be utilized in the preparation of the polyethoxylated interesterified triglyceride oil emulsifier. Examples of suitable triglyceride oils include drying oils such as linseed oil, soybean oil, dehydrated castor oil, fish oil, tung oil, oiticica oil, poppyseed oil, hempseed oil, safflower oil and walnut oil, as well as semi-drying oils and non-drying oils such as corn oil, cottonseed oil, peanut oil and castor oil. In instances where the water-dispersible lecithin composition is to be utilized in a coating composition, it is preferable, but not necessary, to employ a drying oil in the preparation of the polyethoxylated interesterified triglyceride oil emulsifier. It is also contemplated to employ animal fat as the triglyceride oil. In any event, the oil should comprise fatty acid radicals having unsaturated bonds.

The triglyceride drying or semi-drying oil is interesterified with from about 3 percent to about 30 percent, preferably about 15 percent to about 25 percent, by weight, of a polyhydric alcohol. Specific examples of polyhydric alcohols which have been found to be suitable for interesterification of the triglyceride oil include pentaerythritol, glycerol, trimethylol propane monoallyl ether, trimethylol propane and sorbitol. It is also contemplated to employ other polyhydric alcohols of the same general type.

In a specific example of the interesterification of a triglyceride oil with a polyhydric alcohol, 176 pounds of soybean oil is heated to 480° F. in a closed vessel under an inert nitrogen atmosphere. Fifteen pounds of pentaerythritol are added to the heated soybean oil and the mixture is agitated for 5 minutes. Eighty grams of sodium methoxide catalyst mixed with 29 pounds of pentaerythritol are then slowly added to the vessel keeping the temperature of the mixture above about 450° F. The reaction is continued until the product is clear at about 480° F. after which the interesterified triglyceride oil is cooled to room temperature.

The interesterified triglyceride oil is ethoxylated with ethylene oxide in order to provide a polyethoxylated interesterified triglyceride oil emulsifier which, when admixed with lecithin, provides a lecithin composition which is readily water-dispersible. The hydrophilic character of the polyethoxylated interesterified triglyceride oil emulsifier is dependent upon the amount of ethylene oxide present therein, and as the mols of ethylene oxide added per mol of triglyceride oil are increased, the polyethoxylated interesterified triglyceride oil becomes more hydrophilic. However, the increase in the hydrophilic character of the polyethoxylated interesterified oil emulsifier is gradual, and there is no critical upper limit to the number of mols of ethylene oxide that should be added per mol of triglyceride oil in order to provide an emulsifier which will form a water-dispersible lecithin composition. However, in order to obtain satisfactory results at least about 10 mols of ethylene oxide should be added per mol of triglyceride oil although in some instances lesser amounts of ethylene oxide may be utilized. Ethylene oxide concentrations of up to 55 mols of ethylene oxide per mol of oil or higher may be employed to obtain a desirable emulsifier. A particularly desirable water-dispersible lecithin composition is obtained where the polyethoxylated interesterified triglyceride oil emulsifier contains from about 20.2 to 40 mols of ethylene oxide per mol of triglyceride oil.

In a specific example of the preparation of a polyethoxylated interesterified triglyceride oil emulsifier 95 pounds of the soybean oil interesterified with 20 percent by weight of pentaerythritol, as described above, is introduced into a closed reaction vessel and is heated to 300° F. under a nitrogen atmosphere with agitation. One hundred and seven grams of sodium methoxide are added to the interesterified soybean oil and the mixture is heated to 340° F. and 112 pounds of ethylene oxide, in either gaseous or liquid form is added to the reaction vessel through a sparge ring while maintaining the temperature between 300° F. and 360° F. The addition of ethylene oxide is continued until 1 percent excess ethylene oxide is added over the theoretical amount of ethylene oxide required to provide a polyethoxylated interesterified triglyceride oil emulsifier containing the desired number of mols of ethylene oxide per mol of triglyceride oil. One hundred and twelve pounds of ethylene oxide per 95 pounds of interesterified soybean oil provides a polyethoxylated interesterified triglyceride oil emulsifier containing 28.6 mols of ethylene oxide per mol of triglyceride oil.

In some instances it may be desirable to add a polyhydric aliphatic alcohol to the lecithin composition. The polyhydric alcohol may be added in an amount from about 1 percent to about 12 percent by weight of the lecithin composition, preferably about 5 percent. The polyhydric alcohol reduces the viscosity of the lecithin composition and lowers its solidification temperature. The polyhydric alcohol also acts to increase the water-dispersibility of the lecithin composition. Various polyhydric aliphatic alcohols may be utilized. Specific examples of polyhydric aliphatic alcohols include ethylene glycol, propylene glycol and preferably hexylene glycol.

The following table illustrates specific examples of polyethoxylated interesterified triglyceride oil emulsifiers which may be mixed with lecithin in accordance with the present invention to provide a water-dispersible lecithin composition.

TABLE I.—POLYETHOXYLATED INTERESTERIFIED TRIGLYCERIDE OIL EMULSIFIERS

| Example | Triglyceride Oil | Polyhydric Alcohol, Percent by Weight | Mols Ethylene Oxide per mol of Triglyceride Oil |
|---|---|---|---|
| 1 | Linseed | 10% pentaerythritol | 18 |
| 2 | do | 15% pentaerythritol | 15 |
| 3 | do | do | 20.2 |
| 4 | do | 20% pentaerythritol | 11.0 |
| 5 | do | do | 18.7 |
| 6 | do | do | 21.8 |
| 7 | do | do | 18.8 |
| 8 | do | do | 18.7 |
| 9 | do | do | 28.6 |
| 10 | do | 20% glycerol | 12.5 |
| 11 | do | do | 15.4 |
| 12 | do | do | 19.7 |
| 13 | do | do | 27.5 |
| 14 | do | 20% trimethylol propane monoallyl ether | 12.8 |
| 15 | do | do | 15.7 |
| 16 | do | do | 20.0 |
| 17 | do | do | 27.0 |
| 18 | Soybean | 20% pentaerythritol | 28.6 |
| 19 | do | do | 40.0 |
| 20 | do | do | 17.9 |
| 21 | do | do | 53.0 |

The polyethoxylated interesterified triglyceride oil emulsifiers, specific examples of which are set forth above, have excellent emulsifying properties and may be utilized as emulsifiers in various industrial applications, e.g., nonionic latex paints and in curing agents for urethane resins. These polyethoxylated interesterified triglyceride oil emulsifiers have been found to be ideally suited for use as emulsifiers in the preparation of water-dispersible lecithin compositions.

Specific examples of lecithin compositions containing polyethoxylated interesterified triglyceride oil emulsifiers prepared in accordance with the examples set forth in Table I are set forth in Table II.

TABLE II.—WATER-DISPERSIBLE LECITHIN COMPOSITION

| Example | Lecithin, percent by weight | Polyethoxylated Interesterified Triglyceride Oil, percent by weight | Polyhydric Aliphatic Alcohol, percent by weight | Gardner Color and Clarity | Viscosity,[1] Centipoises | Acid[2] Value | Acetone[3] Insolubles |
|---|---|---|---|---|---|---|---|
| 23 | 85 | 10% Example 9 | 5% hexylene glycol | 11, slightly cloudy | 2,590 | 27.5 | [4] 53 |
| 24 | 85 | 10% Example 18 | do | | | | |
| 25 | 85 | 10% Example 7 | do | | | | |
| 26 | 85 | 10% Example 20 | do | 11, slightly cloudy | 2,350 | 24.5 | [4] 53 |
| 27 | 85 | 10% Example 6 | do | do | 3,320 | 24.0 | [4] 53 |
| 28 | 85 | 10% Example 21 | do | 11, clear | 5,100 | 25.0 | [4] 53 |
| 29 | 88 | 10% Example 9 | 2% hexylene glycol | | | | |
| 30 | 90 | 10% Example 19 | None | | | | |
| 31 | 90 | {5% Example 18, 5% Example 21} | None | | | | |

[1] A.O.C.S. Official Method Ka-6-59.
[2] A.O.C.S. Official Method Ja-6-55.
[3] A.O.C.S. Official Method Ja-4-46.
[4] Minimum.

The lecithin compositions prepared in accordance with the examples set forth in Table II are readily dispersible in aqueous mediums, and remain dispersed over extended periods of time. Twenty-five grams of each of the lecithin compositions set forth in Table II are mixed with 100 milliliters of water and placed in a 150 milliliter beaker. The mixture is agitated with a propeller having a one inch radius at 78 r.p.m. for six minutes. Each of the lecithin compositions had excellent water-dispersibility and does not separate from the water when agitation is ceased.

The lecithin compositions set forth in Table II are employed as pigment suspending agents in flat wall paint and in semi-gloss wall paint in order to determine the characteristics of the lecithin composition when employed in coating compositions. The flat wall paint and semi-gloss wall paint employed have the following compositions:

Flat wall paint

Pigment dispersion: Pounds/100 gallons
- Water dispersible lecithin _____ 7
- Propylene glycol _____ 18
- Carbitol _____ 17
- Igepal CO-730 _____ 5
- Potassium carbonate _____ 1
- R-900 _____ 187
- Duramite _____ 195
- Nytal-300 _____ 44
- Satintone #1 _____ 124
- Water _____ 204
- Foamicide 581-B _____ 5

Let down:
- 2.5% Methocel 4000 c.p.s. _____ 180
- PMA-18 _____ 0.3
- Water _____ 77.5
- Polyvinyl acetate CL-202 _____ 150.4
- Farnow C-12 _____ 25
- Advacar cobalt 6% _____ 0.1
- Water _____ 53.6
- 2.5% Methocel 4000 c.p.s. _____ 53

Pigment volume concentration _____percent__ 61
Total solids _____do____ 50.5

Semi-gloss paint

Pigment dispersion: Pounds/100 gallons
- Water dispersible lecithin _____ 8
- Water _____ 53
- Ethylene glycol _____ 12
- 2.5% WP-4400 _____ 100
- Foamicide 581-B _____ 5
- OR-540 _____ 150
- Satintone #1 _____ 50
- Barytes _____ 150
- Ultramarine blue _____ 0.5

Semi-gloss paint—Continued

Let down: Pounds/100 gallons
- Water _____ 132
- 10% potassium hydroxide _____ 30
- Resin emulsion 1302 _____ 340
- Advacar calcium 4% _____ 3.9
- Advacar cobalt 6% _____ 2.3
- Advacar zirconium 6% _____ 4
- 2.5% WP-4400 _____ 70

Pigment volume concentration _____percent__ 31
Total solids _____do____ 53

The flat and semi-gloss paints containing the various water-dispersible lecithin compositions are tested to determine the characteristics of the paint films. The yellowness of the paint film is determined by applying a paint film to a panel and air drying it for 48 hours after which a yellowness reading is taken using Photovolt A-B/6 filters. The panel is then held in darkness for ten days and again tested for yellowness. The scrubbability of the paint film is determined by applying a 6 mil wet film thickness paint coating over a commercial undercoat enameled 6 inch by 18 inch ground glass panel and air drying the panels for 24 hours at 23° C. and 50 percent relative humidity. The scrubbability of the paint coating is tested on a Gardner straight line scrubbability machine during which the panels were kept wet by dripping a soap solution on the panels at the rate of 12 drops per minute.

The hardness of the paint coatings was tested on a comparative basis of 1 to 10, 10 being the hardest, using a Sward rocker and hardness pencils. The gloss reading of the semi-gloss paint coatings is obtained on a Gardner gloss meter using a 60° measurement. The heat stability of the paint compositions is tested by filling one half pint cans three fourths full with paint and sealing the cans. The cans are held in an oven at 150° F. and the pH and viscosity of the paint compositions are checked at the end of one week and two weeks.

TABLE III.—CHARACTERISTICS OF FLAT WALL PAINT INCORPORATING WATER-DISPERSIBLE LECITHIN

| Example | Water Dispersible Lecithin | Pigment[1] Dispersion Viscosity, KU | Pigment Dispersion, pH | Paint[1] Viscosity, KU | Drying Time, Minutes | Film Hardness after 48 Hours | Yellowness | | Scrubbability | Heat Stability at 150° C. | | | |
|---|---|---|---|---|---|---|---|---|---|---|---|---|---|
| | | | | | | | 48 hrs. | 10 days | | 1 week | | 2 weeks | |
| | | | | | | | | | | pH | Viscosity,[1] KU | pH | Viscosity,[1] KU |
| 32 | Ex. 23 | 80 | 7.5 | 77 | 20 | 8 | .0440 | .0397 | 1800 | 7.3 | 72 | 7.1 | 74 |
| 33 | Ex. 24 | 78 | 7.1 | 72 | 20 | 9 | .0451 | .0449 | 1500 | 7.0 | 70 | 6.7 | 69 |
| 34 | Ex. 24 | 70 | 7.1 | 79 | 20 | 10 | .0470 | .0505 | 2000+ | 7.0 | 71 | 7.0 | 72 |
| 35 | Ex. 26 | 69 | 7.5 | 76 | 20 | 10 | .0395 | .0505 | 2000+ | 7.2 | 70 | 7.2 | 71 |
| 36 | Ex. 27 | 75 | 7.5 | 77 | 20 | 8 | .0340 | .0454 | 1800 | 7.1 | 72 | 7.0 | 74 |
| 37 | Ex. 28 | 69 | 7.3 | 74 | 20 | 9 | .0395 | .0454 | 1300 | 7.2 | 70 | 7.1 | 73 |
| 38 | Ex. 29 | 68 | 7.1 | 79 | 20 | 9 | .0446 | .0681 | 2000+ | 7.0 | 70 | 7.0 | 74 |
| 39 | Ex. 30 | 83 | 7.1 | 72 | 20 | 10 | .0451 | .0451 | 2000+ | 7.0 | 70 | 6.5 | 74 |
| 40 | Ex. 31 | 82 | 7.1 | 73 | 20 | 9 | .0449 | .0446 | 2000+ | 7.0 | 70 | 6.3 | 69 |

[1] Federal Test Method Standard No. 141, Method 4281.

TABLE IV.—CHARACTERISTICS OF SEMI-GLOSS PAINT INCORPORATING WATER-DISPERSIBLE LECITHIN

| Example | Water Dispersible Lecithin | Dispersion Viscosity,[1] KU | Pigment Dispersion, pH | Paint Viscosity,[1] KU | Film Hardness | | Drying Time, Hours | Gloss | Scrubbability | Heat Stability at 150° F. | | | |
|---|---|---|---|---|---|---|---|---|---|---|---|---|---|
| | | | | | 16 hours | 5 days | | | | 1 week | | 2 weeks | |
| | | | | | | | | | | pH | Viscosity,[1] KU | pH | Viscosity,[1] KU |
| 41 | Ex. 23 | 104 | 8.5 | 67 | 6 | 10 | 3 | 64 | 2000+ | 8.3 | 69 | 8.1 | 69 |
| 42 | Ex. 24 | 115 | 8.5 | 68 | 6 | 10 | 3 | 53 | 2000+ | 8.1 | 66 | 7.5 | 68 |
| 43 | Ex. 26 | 115 | 8.5 | 65 | 7 | 10 | 3 | 52 | 2000+ | 8.2 | 66 | 8.0 | 69 |
| 44 | Ex. 27 | 116 | 8.6 | 67 | 6 | 10 | 3 | 57 | 2000+ | 8.2 | 68 | 8.0 | 70 |
| 45 | Ex. 28 | 101 | 8.4 | 65 | 6 | 10 | 3 | 53 | 2000+ | 8.0 | 72 | 8.0 | 74 |
| 46 | Ex. 29 | 116 | 8.8 | 68 | 5 | 10 | 3 | 49 | 825 | 8.3 | 72 | 7.9 | 83 |

[1] Federal Test Method Standard No. 141, Method 4281.

The paint compositions containing water-dispersible lecithin compositions of the present invention set forth in Tables III and IV formed paint films having excellent characteristics and are considered to be wholly satisfactory for use as industrial and home paints. Brushes utilized to apply the flat paint and the semi-gloss paint had good cleanup properties and could be readily cleaned using soap and tap water. The paint compositions had good leveling properties and did not show excessive brush strokes.

It can be seen that a lecithin composition has been provided which is readily water-dispersible and which is satisfactory for use as a pigment suspending agent in paint compositions. A method has also been provided for treating lecithin to increase the water-dispersibility thereof. Water-base paint compositions containing a water-dispersible lecithin of the present invention provide good coating characteristics.

Various of the features of the present invention are set forth in the following claims.

What is claimed is:

1. A water-dispersible lecithin composition comprising from about 2 percent to about 20 percent by weight of a polyethoxylated interesterified triglyceride oil containing at least about 10 mols of ethylene oxide per mol of triglyceride oil, said triglyceride oil being interesterified with from about 3 percent to about 30 percent by weight of polyhydric alcohol, the remainder of said composition being lecithin.

2. A water-dispersible lecithin composition comprising from about 2 percent to about 20 percent by weight of a polyethoxylated interesterified unsaturated triglyceride oil containing at least about 10 mols of ethylene oxide per mol of triglyceride oil, said triglyceride oil being interesterified with from about 3 percent to about 30 percent by weight of a polyhydric alcohol selected from the group consisting of glycerol, pentaerythritol, trimethylol propane, trimethylol propane monoallyl ether and sorbitol, the remainder of said composition being lecithin.

3. A water-dispersible lecithin composition comprising, about 75 percent to about 90 percent by weight lecithin, from about 2 percent to about 20 percent by weight of a polyethoxylated interesterified triglyceride oil containing at least about 10 mols of ethylene oxide per mol of triglyceride oil, said triglyceride oil being interesterified with from about 3 percent to about 30 percent by weight of a polyhydric alcohol, selected from the group consisting of glycerol, pentaerythritol, trimethylol propane, trimethylol propane monoallyl ether and sorbitol and from about 1 percent to about 12 percent by weight of a polyhydric aliphatic alcohol.

4. A water-dispersible lecithin composition comprising, about 75 percent to about 90 percent by weight lecithin, from about 5 percent to about 15 percent by weight of a polyethoxylated interesterified triglyceride oil containing at least about 10 mols of ethylene oxide per mol of triglyceride oil, said triglyceride oil being interesterified with from about 3 percent to about 30 percent by weight of a polyhydric alcohol, selected from the group consisting of glycerol, pentaerythritol, trimethylol propane, trimethylol propane monoallyl ether and sorbitol and from about 1 percent to about 12 percent by weight of a polyhydric aliphatic alcohol.

5. A water-dispersible lecithin composition comprising, about 75 percent to about 90 percent by weight lecithin, from about 5 percent to about 15 percent by weight of a polyethoxylated interesterified unsaturated triglyceride oil containing at least about 10 mols of ethylene oxide per mol of triglyceride oil, said triglyceride oil being interesterified with from about 10 percent to about 25 percent by weight of a polyhydric alcohol selected from the group consisting of pentaerythritol, glycerol, trimethylol propane, trimethylol propane monoallyl ether and sorbitol, and from about 1 percent to about 12 percent by weight of a polyhydric aliphatic alcohol.

6. A water-dispersible lecithin composition comprising, about 75 percent to about 90 percent by weight lecithin, from about 5 percent to about 15 percent by weight of a polyethoxylated interesterified unsaturated triglyceride oil selected from the group consisting of linseed oil, soybean oil and dehydrated castor oil containing at least about 10 mols of ethylene oxide per mol of vegetable oil, said triglyceride oil being interesterified with from about 3 percent to about 30 percent by weight of a polyhydric alcohol selected from the group consisting of pentaerythritol, glycerol, trimethylol propane, trimethylol propane monoallyl ether and sorbitol, and from about 1 percent to about 12 percent by weight of a polyhydric aliphatic alcohol.

7. A water-dispersible lecithin composition comprising, about 75 percent to about 90 percent by weight lecithin, from about 5 percent to about 15 percent by weight of a polyethoxylated interesterified linseed oil containing at least about 10 mols of ethylene oxide per mol of linseed oil, said linseed oil being interesterified with from about 10 percent to about 25 percent by weight of a polyhydric alcohol selected from the group consisting of pentaerythritol, glycerol, trimethylol propane, trimethylol propane monoallyl ether, and sorbitol, and from about 1 percent to about 12 percent by weight of a polyhydric aliphatic alcohol.

8. A water-dispersible lecithin composition comprising, about 75 percent to about 90 percent by weight lecithin, from about 5 percent to about 15 percent by weight of a polyethoxylated interesterified soybean oil containing at least about 10 mols of ethylene oxide per mol of soybean oil, said soybean oil being interesterified with from about 10 percent to about 25 percent by weight of a polyhydric alcohol selected from the group consisting of pentaerythritol, glycerol, trimethylol propane, trimethylol propane monoallyl ether and sorbitol, and from about 1 percent to about 12 percent by weight of a polyhydric aliphatic alcohol.

9. A water-dispersible lecithin composition comprising, about 75 percent to about 90 percent by weight lecithin, from about 5 percent to about 15 percent by weight of a polyethoxylated interesterified dehydrated castor oil containing at least about 10 mols of ethylene oxide per mol of dehydrated castor oil, said dehydrated castor oil being interesterified with from about 10 percent to about 25 percent by weight of a polyhydric alcohol selected from the group consisting of pentaerythritol, glycerol, trimethylol propane, trimethylol propane monoallyl ether and sorbitol, and from about 1 percent to about 12 percent by weight of a polyhydric aliphatic alcohol.

10. A water-dispersible lecithin composition comprising, about 85 percent by weight lecithin, about 10 percent by weight of a polyethoxylated interesterified triglyceride oil selected from the group consisting of linseed oil, soybean oil and dehydrated castor oil containing at least about 10 mols of ethylene oxide per mol of triglyceride oil, said triglyceride oil being interesterified with from about 3 percent to about 30 percent by weight of a polyhydric alcohol selected from the group consisting of pentaerythritol, glycerol, trimethylol propane, trimethylol propane monoallyl ether and sorbitol, and about 5 percent by weight hexylene glycol.

References Cited by the Examiner

UNITED STATES PATENTS

| | | | |
|---|---|---|---|
| 2,062,782 | 12/1936 | Epstein et al. | 252—356 |
| 2,296,933 | 9/1942 | Stroud | 252—356 XR |
| 2,380,166 | 7/1945 | Griffin | 252—356 XR |
| 2,777,817 | 1/1957 | Werly | 252—363.5 |
| 3,069,361 | 12/1962 | Cogswell | 252—363.5 |

JULIUS GREENWALD, *Primary Examiner.*